United States Patent [19]

Dankwardt

[11] Patent Number: 5,165,193
[45] Date of Patent: Nov. 24, 1992

[54] REMOTE CONTROLLED FISHING APPARATUS

[76] Inventor: Gregory A. Dankwardt, 2129 N. President, Wheaton, Ill. 60187

[21] Appl. No.: 783,530

[22] Filed: Oct. 28, 1991

[51] Int. Cl.⁵ .............................................. A01K 97/00
[52] U.S. Cl. ...................................................... 43/26.1
[58] Field of Search ...................................... 43/26.1, 4

[56] References Cited

U.S. PATENT DOCUMENTS

| | | | |
|---|---|---|---|
| 3,106,796 | 10/1963 | Friedland | 43/26.1 |
| 3,710,500 | 1/1973 | Pena | 43/26.1 |
| 4,161,077 | 7/1979 | Ciaccio et al. | 43/26.1 |
| 4,339,888 | 7/1982 | Sheng-Jung | 43/26.1 |
| 4,635,391 | 1/1987 | Early | 43/26.1 |
| 4,757,633 | 7/1988 | Van Cleve | 43/26.1 |
| 4,856,222 | 8/1989 | Hannam | 43/4.5 |

FOREIGN PATENT DOCUMENTS 2204233  8/1973  Fed. Rep. of Germany ....... 43/26.1

Primary Examiner—Richard K. Seidel
Assistant Examiner—Jeanne M. Elpel
Attorney, Agent, or Firm—Leon Gilden

[57] ABSTRACT

A fishing procedure is enhanced by utilization of a boat member operatively directed utilizing a transmitter, with a receiver mounted within the boat member to selectively actuate a drive motor and rudder therewithin. The boat member includes a boat deck, the boat deck including a door plate, wherein the door plane utilizes a spring hinge to normally bias the door plate at an oblique including angle between the deck and the door plate for a first latched position mounting the door plate in a parallel relationship relative to the boat deck. The door plate is arranged to position a fishing hook of an associated fishing line to remotely position a fishing pole and permit directing of the fishing hook to a spaced relationship in a body of water prior to its projection into the body of water by disengaging the door plate relative to the boat deck.

4 Claims, 5 Drawing Sheets

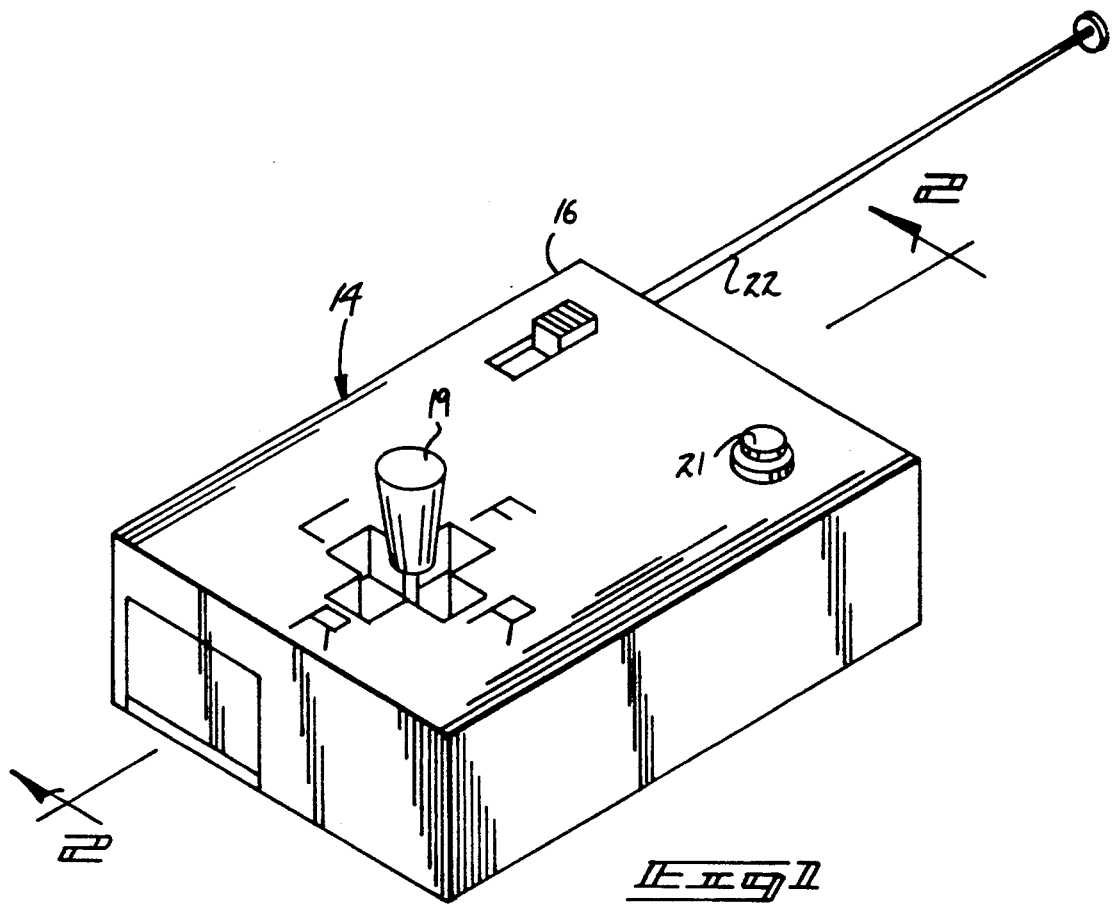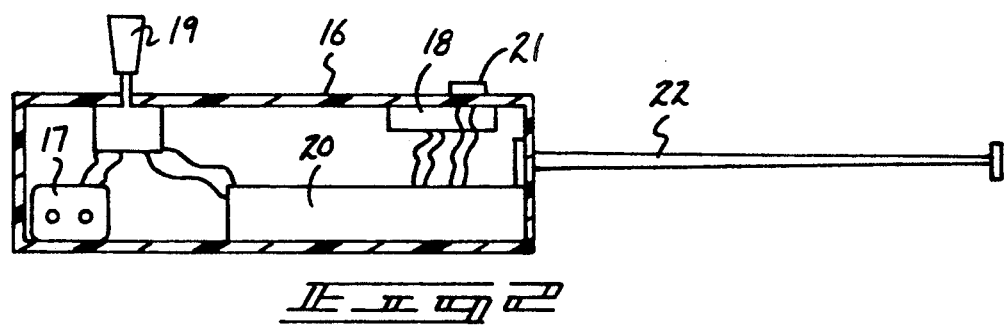

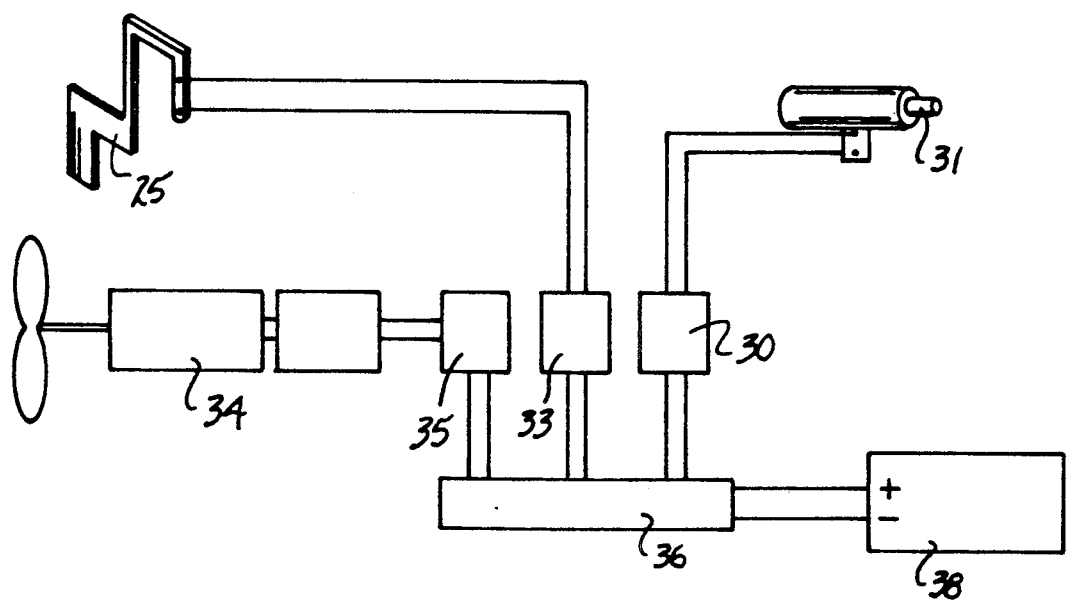

REMOTE CONTROLLED FISHING APPARATUS

BACKGROUND OF THE INVENTION

1. Field of the Invention

The field of invention relates to fishing apparatus, and more particularly pertains to a new and improved fishing apparatus wherein the same is arranged for projection of a fishing hook in a remote orientation relative to a fishing pole or source of fishing line.

2. Description of the Prior Art

Typical casting procedures utilized in fishing arrangements are arranged to project a fishing hook relative to a fishing pole or source of fishing line. Typically, to provide access to remote portions of the lake or body of water, an individual must utilize a boat to traverse the body of water. The instant invention provides for a unique compact structure to position projecting fishing hook relative to an individual positioned on a shoreline of an associated body of water.

Prior art structure relative to casting and displacement of fishing hooks relative to an individual may be found in U.S. Pat. No. 4,648,194 to Carroll, Jr. wherein a balloon is arranged to direct a fishing line in a spaced relationship relative to an individual mounted upon a shoreline.

U.S. Pat. No. 3,962,813 to Moon; U.S. Pat. No. 4,773,179 to Corley; U.S. Pat. No. 4,127,957; and U.S. Pat. No. 3,292,296 to Viveiros are all arranged for projecting and displacing a fishing hook relative to a source of line such as utilizing a projection arrow and the like.

As such, it may be appreciated that there continues to be a need for a new and improved fishing apparatus as set forth by the instant invention which addresses both the problems of ease of use as well as effectiveness in construction which permits the long range positioning of a fishing hook and bait relative to an individual positioned upon a shoreline and in this respect, the present invention substantially fulfills this need.

SUMMARY OF THE INVENTION

In view of the foregoing disadvantages inherent in the known types of fishing apparatus now present in the prior art, the present invention provides a fishing apparatus wherein the same utilizes a remotely positioned flotation boat operative through a transmitter receiver arrangement to direct the boat in a spaced relationship relative to a fishing individual. As such, the general purpose of the present invention, which will be described subsequently in greater detail, is to provide a new and improved fishing apparatus which has all the advantages of the prior art fishing apparatus and none of the disadvantages.

To attain this, the present invention provides a fishing procedure enhanced by utilization of a boat member operatively directed utilizing a transmitter, with a receiver mounted within the boat member to selectively actuate a drive motor and rudder therewithin. The boat member includes a boat deck, the boat deck including a door plate, wherein the door plate utilizes a spring hinge to normally bias the door plate at an oblique included angle between the deck and the door plate for a first latched position mounting the door plate in a parallel relationship relative to the boat deck. The door plate is arranged to position a fishing hook of an associated fishing line to remotely position a fishing pole and permit directing of the fishing hook to a spaced relationship in a body of water prior to its projection into the body of water by disengaging the door plate relative to the boat deck.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing apparatus which has all the advantages of the prior art fishing apparatus and none of the disadvantages.

It is another object of the present invention to provide a new and improved fishing apparatus which may be easily and efficiently manufactured and marketed.

It is a further object of the present invention to provide a new and improved fishing appartus which is of a durable and reliable construction.

An even further object of the present invention is to provide a new and improved fishing apparatus which is susceptible of a low cost of manufacture with regard to both materials and labor, and which accordingly is then susceptible of low prices of sale to the consuming public, thereby making such fishing apparatus economically available to the buying public.

Still yet another object of the present invention is to provide a new and improved fishing apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the transmitter utilized by the invention.

FIG. 2 is an orthographic view, taken along the lines 2—2 of FIG. 1 illustrating representative components positioned positioned within the transmitter structure.

FIG. 8 is a diagrammatic schematic illustration of the boat receiver components utilized in an operative association.

DESCRIPTION OF THE PREFERRED EMBODIMENT

Figure 3:
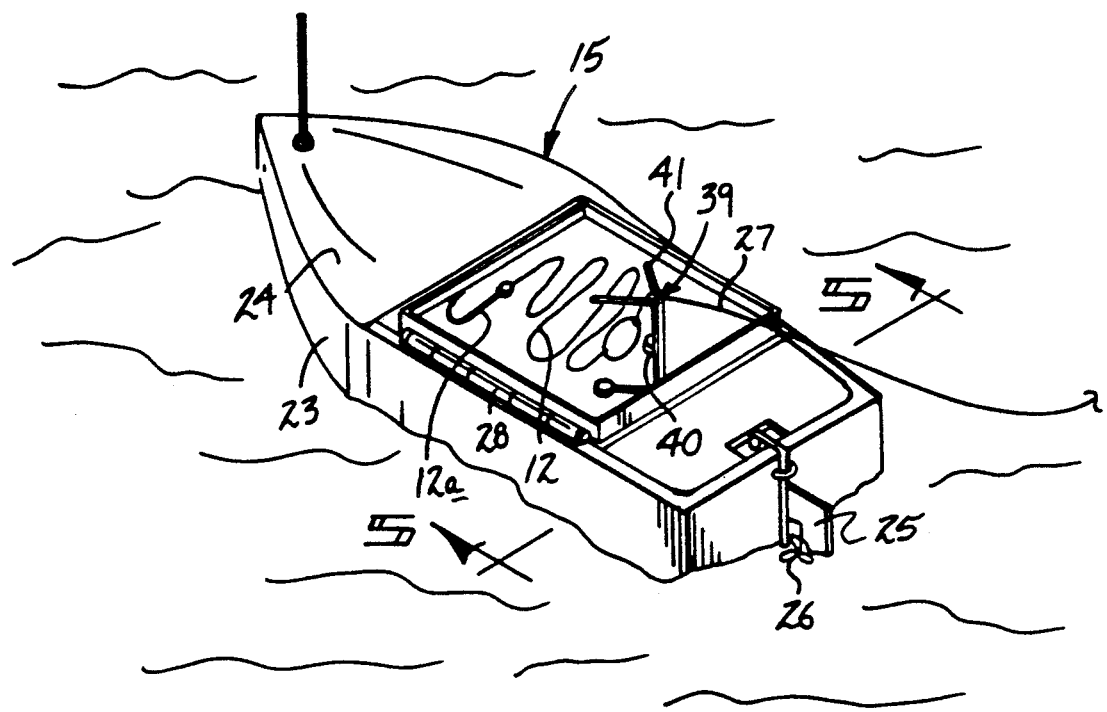
FIG. 3 is an isometric illustration of the boat receiver utilized by the invention.
Figure 4:
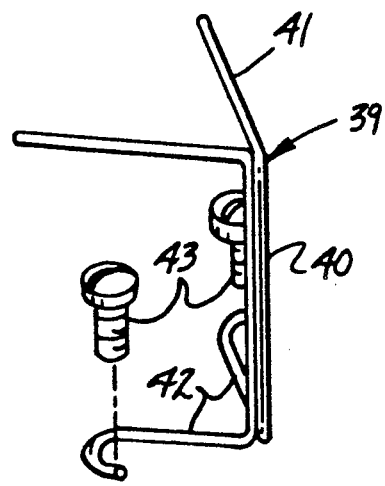
FIG. 4 is an isometric illustration of the positioning bracket utilized by the invention.

With reference now to the drawings, and in particular to FIGS. 1 to 8 thereof, a new and improved fishing apparatus embodying the principles and concepts of the present invention and generally designated by the reference numeral 10 will be described.

Figure 7:
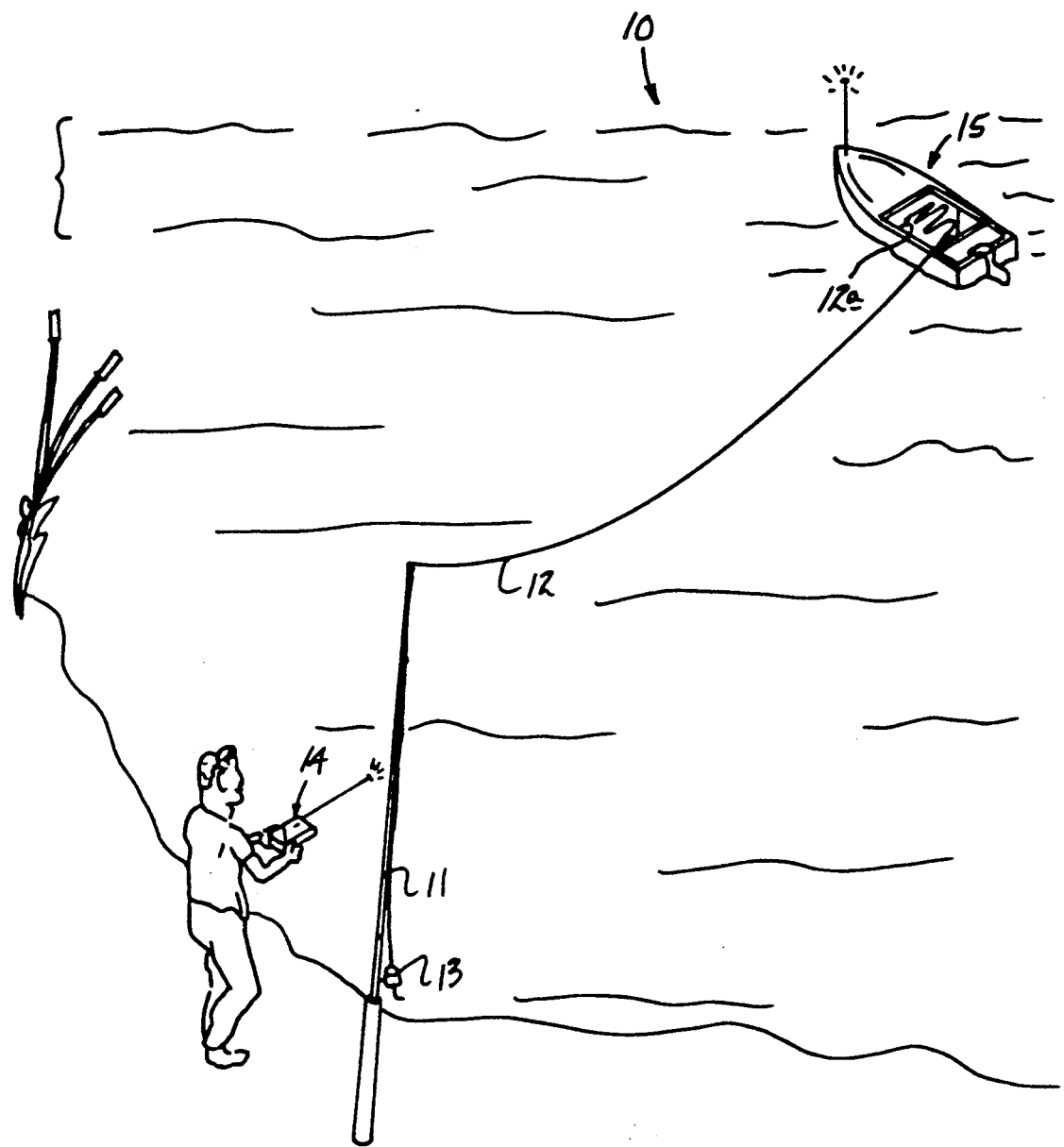
FIG. 7 is an isometric illustration of the organization in use.

More specifically, the fishing apparatus 10 of the instant invention essentially comprises the configuration, as illustrated in the FIG. 7, to include a fishing pole 11 mounting a fishing line 12 utilizing a source such as a fishing reel 13. A fishing hook 12a secured to a forward distal end of the fishing line 12 is mounted upon a boat receiver assembly 15 for transport in a remote orientation relative to the pole 11, wherein an operator utilizes a portable transmitter 14 to effect control of the boat receive assembly 15.

The transmitter 14 includes a transmitter housing 16 to include a battery 17 operative through an on/off switch 18. A directional toggle 19 effects actuation of the pivotally mounted rudder 25 mounted to a rear portion of the boat receiver assembly 15. The operation of the on/off switch 18 effects actuation of a third servo driver member 35 to effect actuation of the drive member 34 and the associated propeller drive 26 positioned exteriorly of the stern of the boat hull 23.

The directional toggle 19 effects actuation of a second servo drive 33 to effect rotation of the pivotally mounted rudder 25 positioned rearwardly of the stern of the boat hull 26, wherein the transmitter 20 is operative through a transmitter battery 17 and the transmitter antenna 22 to direct the signal to the associated receiver antenna 37. The transmitter housing 16 also utilizes a trap door actuator button 21 to actuate a signal to be received by a first servo drive 30, to be discussed in more detail below.

Figure 5:
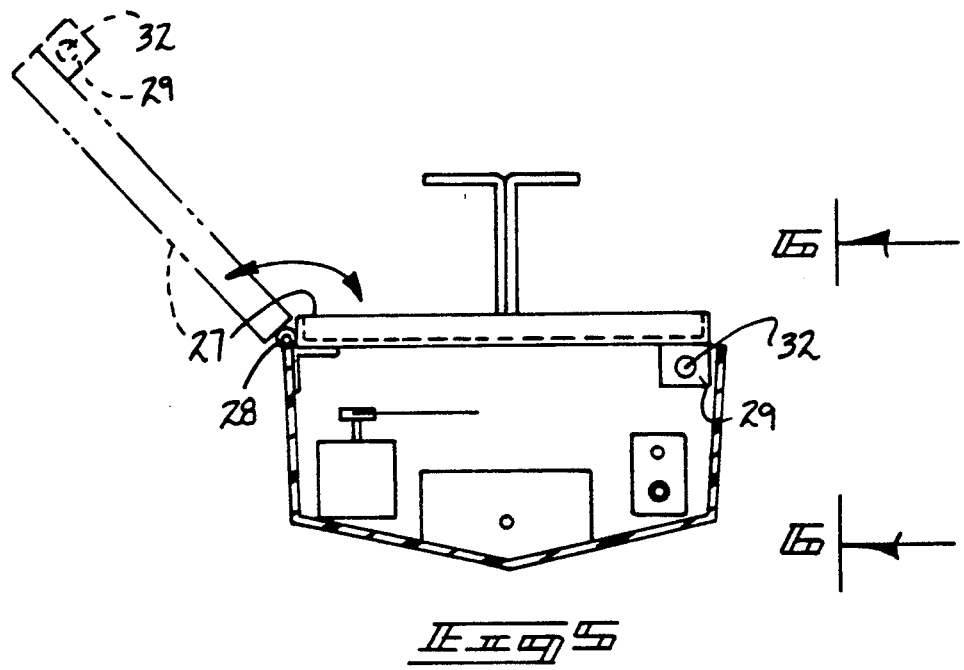
FIG. 5 is an orthographic view, taken along the lines 5—5 of FIG. 3 in the direction indicated by the arrows.
Figure 6:
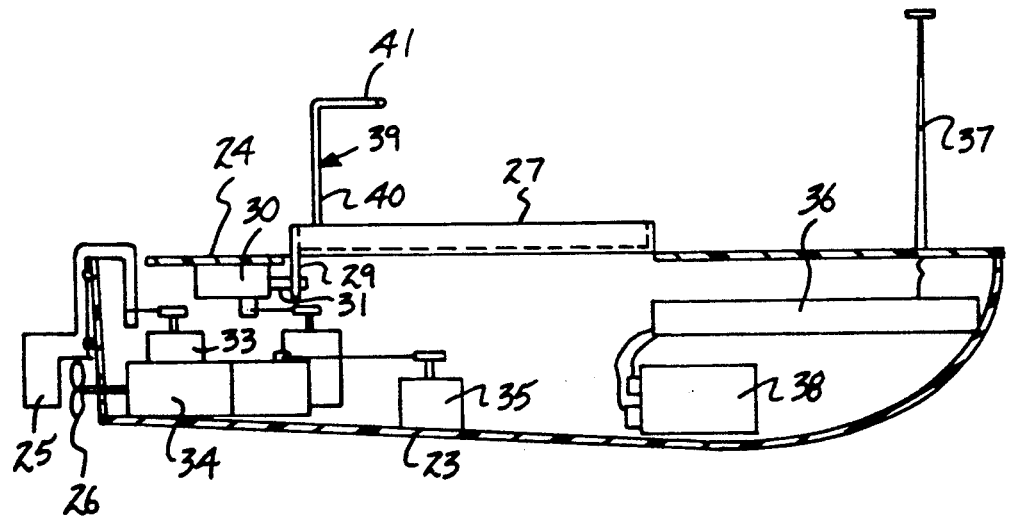
FIG. 6 is an orthographic view, taken along the lines 6—6 of FIG. 5 in the direction indicated by the arrows.

The boat hull 23 includes a boat deck 24 positioned coextensively with the boat hull 23 defining a top surface thereof, wherein the boat deck 24 includes a pivotally mounted door plate 27 mounted within the boat hull 24 hingedly mounted about a spring hinge 28. The spring hinge 28 (see FIG. 5) effects pivotment of the door plate 27 to the second position, as illustrated in phantom in FIG. 5, from the first position actuated upon release of the door plate 27 by the first servo drive 30. The door plate 28 includes a door plate latch plate 29 extending orthogonally downwardly from the door plate 27 to include a latch plate aperture 32. The first servo drive 30 includes a first servo drive 31 reciprocatably mounted within the first servo drive 30 that is retracted upon actuation of the first servo drive to effect removal of the rod 31 relative to the latch plate aperture 32 to permit pivotment of the latch plate 27 from the first position, as illustrated in FIG. 5, to the second position, as illustrated in FIG. 5 in phantom. In this manner, a fishing line hook 12a and its associated line 12 positioned upon the door plate 27, as illustrated in FIG. 3, is projected into the surrounding body of water when an operator determines that sufficient positioning and placement of the boat hull 23 has been effected. At that instant, the trap door actuator button 21 is depressed and actuation of the first servo drive 30 to retract the rod 31 relative to the latch plate aperture 32 is effected.

A receive 36 is mounted within the hull 23 in cooperation with the receiver antenna 37 that projects exteriorly and upwardly relative to the deck 24. The receiver battery 38 provides electrical energy to the circuitry utilized in the device.

It should be further noted that to provide relative tangle-free engagement of the line when mounted upon the deck, or more specifically the door plate 27, a positioning bracket 39 is fixedly mounted extending upwardly of the deck 27 to space the line 23 that is directed rearwardly of the deck to the associated fishing pole 11 in a spaced relationship to avoid tangling of the line relative to the boat receive assembly 15. The positioning bracket 39 includes a vertical post 40 orthogonally oriented relative to the deck 27, with a "V" shaped positioning fork 41 mounted at an upper terminal end in an orthogonal relationship relative to the support post 40. Mounting legs 42 positioned at a lower terminal end of the support post 40 include fasteners 43 to fixedly secure the mounting legs 42 and the associated bracket 39 to the door plate 27.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letter Patent of the United States is as follows:

1. A fishing apparatus, comprising, a fishing pole, the fishing pole including
a fishing reel, the fishing reel including a predetermined quantity of fishing line extending from the fishing reel along the fishing pole, and the fishing line including a fishing line hook mounted at a forward distal end of the fishing line, and
a boat receiver assembly mounting the fishing line hook thereon, and
the boat receiver assembly including a drive motor, the drive motor including a propeller drive extending from the drive motor exteriorly of a rear portion of the boat receiver assembly, and
a transmitter means arranged for effecting selective actuation of the drive motor and the propeller drive for directing the fishing line hook in a spaced relationship relative to the fishing pole when the boat receiver assembly means is positioned upon a body of water, and
the boat receiver assembly includes a boat hull, the boat hull including a boat deck formed to an upper terminal end of the boat hull, the boat deck including a door plate, the door plate including a spring hinge, the spring hinge mounted to the door plate and to the boat hull to bias the door plate in a spaced relationship relative to the boat deck in a second position from a first position, wherein the door plate is arranged parallel to the boat deck, and
the door plate includes a door plate latch plate, and the door plate latch plate includes a latch plate aperture, and a first servo drive member mounted to the boat deck, and the first servo drive including a first servo drive rod reciprocatably mounted within the servo drive, wherein the first servo drive rod is directed within the latch plate aperture in a first position and wherein the first servo drive rod is removed from the latch plate aperture in a second position, and the transmitter means includes a trap door actuator button to effect actuation of the first servo drive to direct the first servo drive rod to the second position.

2. An apparatus as set forth in claim 1 wherein the boat receiver assembly includes a receiver mounted within the boat hull, and the receiver includes a receiver antenna projecting in a spaced relationship relative to the boat deck, and a receiver battery, and the receiver battery and the receiver in electrical communication with the first servo drive and the second servo drive.

3. An apparatus as set forth in claim 1 wherein the rudder includes a third servo drive, and the third servo drive is operative through the transmitter means to effect actuation of the third servo drive to effect manipulation of the rudder.

4. An apparatus as set forth in claim 3 wherein the door plate latch plate includes a positioning bracket fixedly mounted to the door plate latch plate, the positioning bracket includes a vertical support post orthogonally and fixedly mounted to a top surface of the door plate latch plate, and the vertical support post including a "V" shaped positioning plate positioned at an upper terminal end of the vertical support post to position a portion of the fishing line directed rearwardly of the "V" shaped position fork relative to the boat deck.

* * * * *